(12) United States Patent
Li

(10) Patent No.: US 6,424,778 B1
(45) Date of Patent: Jul. 23, 2002

(54) OPTICAL FIBER WITH LARGE EFFECTIVE AREA AND LOW DISPERSION SLOPE FOR SUBMARINE APPLICATIONS

(75) Inventor: Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/631,415

(22) Filed: Aug. 3, 2000

Related U.S. Application Data
(60) Provisional application No. 60/156,764, filed on Sep. 29, 1999.

(51) Int. Cl.[7] .................................................. G02B 6/02
(52) U.S. Cl. ........................................ 385/127; 385/124
(58) Field of Search ............................... 385/123, 124, 385/126, 127

(56) References Cited

U.S. PATENT DOCUMENTS

| | | | |
|---|---|---|---|
| 5,483,612 A | 1/1996 | Gallagher et al. | 385/127 |
| 5,553,185 A * | 9/1996 | Antos et al. | 385/127 |
| 5,684,909 A | 11/1997 | Liu | 385/127 |
| 5,715,346 A | 2/1998 | Liu | 385/124 |
| 5,721,800 A | 2/1998 | Kato et al. | 385/127 |
| 5,748,824 A | 5/1998 | Smith | 385/124 |
| 5,781,684 A | 7/1998 | Liu | 385/124 |
| 5,835,655 A | 11/1998 | Liu et al. | 385/124 |
| 5,852,701 A | 12/1998 | Kato et al. | 385/127 |
| 6,072,929 A | 6/2000 | Kato et al. | 385/123 |
| 6,301,422 B1 * | 10/2001 | Li | 385/127 |
| 6,317,551 B1 * | 11/2001 | Mitchell et al. | 385/124 |
| 6,335,995 B1 * | 1/2002 | Kato et al. | 385/123 |

FOREIGN PATENT DOCUMENTS

| | | |
|---|---|---|
| EP | 0 851 245 | 7/1998 |
| EP | 1 037 074 | 9/2000 |
| WO | WO 99/30194 | 6/1999 |

* cited by examiner

*Primary Examiner*—John D. Lee
*Assistant Examiner*—Sarah U Song
(74) *Attorney, Agent, or Firm*—William J. Chervenak

(57) ABSTRACT

A single mode optical waveguide fiber having large effective area and low dispersion slope has a core having segments. The mode power distribution in the fiber is determined by the refractive index profile of the respective segments. The refractive index profile of each segment is characterized by a relative refractive index percent, and an inner and outer radius.

17 Claims, 2 Drawing Sheets

OPTICAL FIBER WITH LARGE EFFECTIVE AREA AND LOW DISPERSION SLOPE FOR SUBMARINE APPLICATIONS

This application claims priority to and the benefit of U.S. Provisional Patent Application No. 60/156,764, filed Sep. 29, 1999.

BACKGROUND OF THE INVENTION

1. Field of the Invention

The invention is directed to a single mode optical waveguide fiber for use in telecommunication systems and more particularly, a waveguide fiber which reduces non-linear dispersion effects, combines bend resistance, low attenuation, and large effective area features desired for underground and undersea applications.

2. Technical Background

Optical amplifier technology and wavelength division multiplexing techniques are typically required in telecommunication systems that require high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the meaning of high power and long distance. However, for most purposes, high power is an optical power greater than about 10 mW. In some applications, power levels of 1 mW or less are still sensitive to non-linear effects, so that the effective area is still an important consideration in such lower power systems. A long distance is one in which the distance between electronic regenerators can be in excess of 100 km. The regenerators are to be distinguished from repeaters which make use of optical amplifiers. Repeater spacing, especially in high data density systems, can be less than half the regenerator spacing. To provide a suitable waveguide for a multiplex transmission, the total dispersion should be low, but not zero, and have a low slope over the window of operating wavelength.

Generally, an optical waveguide fiber having a large effective area, $A_{eff}$, reduces non-linear optical effects, including self phase modulation, four wave mixing, cross phase modulation, and non-linear scattering processes, all of which can cause degradation of signals in high powered systems. A waveguide fiber having a segmented core can generally provide a large effective area while limiting the non-linear optical effects.

The mathematical description of these non-linear effects includes the ratio, $P/A_{eff}$, where P is the optical power. For example, a non-linear optical effect can be described by an equation containing a term, $\exp[P \times L_{eff}/A_{eff}]$, where $L_{eff}$ is effective length. Thus, an increase in $A_{eff}$ produces a decrease in the non-linear contribution to the degradation of a light signal. A core having multiple segments each characterized by a refractive index profile, a relative index, and a radius, meets many of the desired functional properties.

The requirement in the telecommunication industry for greater information capacity over long distances, without electronic signal regeneration, has led to a reevaluation of single mode fiber index profile design. The focus of this reevaluation has been to provide optical waveguides which:

reduce non-linear effects such as those noted above;
are optimized for the lower attenuation operating wavelength range around 1550 nm;
are compatible with optical amplifiers; and, retain the desirable properties of waveguides such as high strength, fatigue resistance, and bending resistance.

Communication systems which typically require one gigabyte, and higher, transmission rates, together with regenerators spacing in excess of 100 km, typically make use of optical amplifier technology or wavelength division multiplexing techniques. Thus waveguide fiber manufacturers have designed waveguides which are less susceptible to non-linear effects induced by higher power signals or by four wave mixing, which can occur in multiplexing systems. A suitable waveguide fiber must have low linear dispersion and low attenuation as well. In addition, the waveguide fiber must display these properties over a particular extended wavelength range in order to accommodate wavelength division multiplexing used for multiple channel transmission.

Submarine systems, which are normally several thousand kilometers in length, pose more stringent requirements on waveguide fiber profile designs. In such systems the non-linear effect modulational instability can cause significant accumulated signal distortion and thus system performance degradation. To overcome this problem, in addition to the optical waveguide fiber properties listed above, the dispersion of the waveguide over the wavelength window of operation is preferably negative.

Waveguide designs which also are relatively easy to manufacture and which permit management of dispersion are favored, because of their low cost and added flexibility. The designs described herein are well suited to a dispersion managing strategy in which the waveguide dispersion is varied along the waveguide fiber length to toggle the total dispersion between positive and negative values.

U.S. Pat. No. 5,781,684, incorporated herein by reference as though fully set forth in its entirety, discloses and describes a segmented core waveguide fiber having a large effective area. A feature of the segmented core of the waveguide fiber disclosed in the '684 patent is that it at least one of the segments has a negative or a relative refractive index. The present application discloses and describes segmented core waveguide fibers that provide a unique set of functional properties.

SUMMARY OF THE INVENTION

This invention meets the need for a single mode optical waveguide fiber that offers the benefits of a relatively large effective area together with a substantially flat, negative, dispersion over an extended operating range.

The invention relates to a single mode optical waveguide fiber including a segmented core. Each of the segments is described by a refractive index profile, a relative refractive index percent, and an inner and outer radius. In two embodiments of the present invention disclosed herein, at least one of the segments has a negative relative refractive index percent. The optical waveguide fiber further includes a clad layer surrounding and in contact with the core, and having a refractive index profile.

In a preferred embodiment, the index profiles are further selected to provide a dispersion slope of less than about 0.1 ps/nm$^2$-km. A further embodiment has a dispersion slope of less than 0.08 ps/nm$^2$-km while maintaining a bend induced loss in the pin array test less than about 9 dB and preferably less than 8.8 dB.

In addition, embodiments having induced attenuation loss due to lateral load bending less than 0.25 dB/km and preferably less than 0.208 dB/km are disclosed and described.

Reference will now be made in detail to the present preferred embodiments of the invention, examples of which are illustrated in the accompanying drawings. Exemplary embodiment of the segmented core refractive index profile of the present invention is shown in each of the figures.

DETAILED DESCRIPTION OF THE PREFERRED EMBODIMENT

Figure 1:
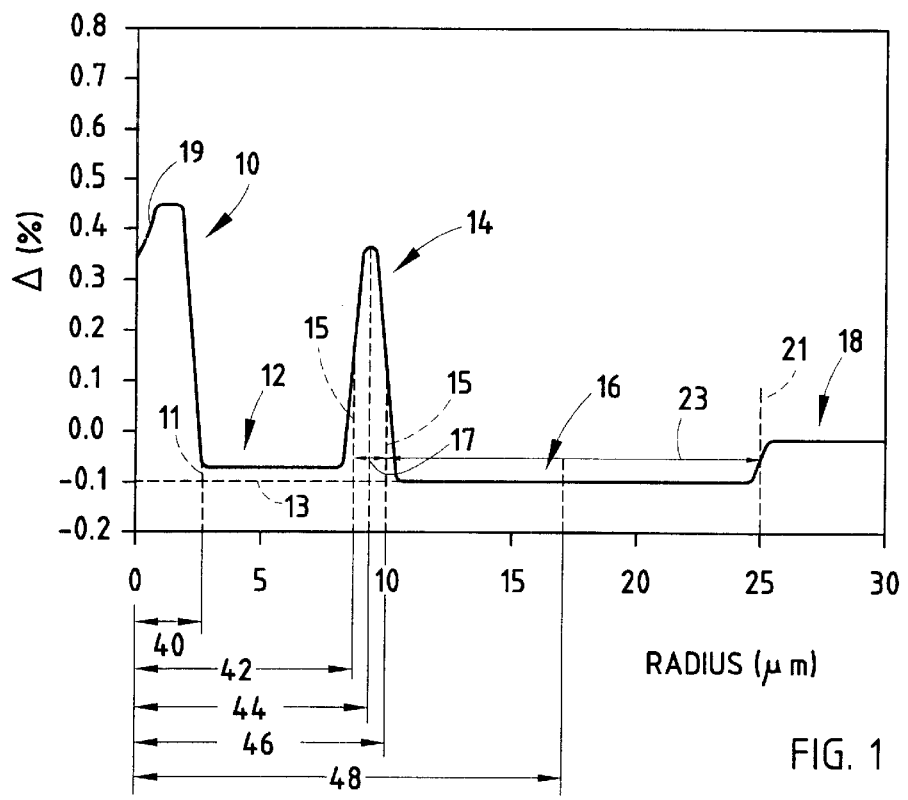
FIG. 1 is a diagram of the waveguide fiber refractive index profile of an optical waveguide having a four segment core and a negative relative index in the first and third annular segments.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

Definitions

The following definitions are commonly used in the art. The radii of the segments of the core is defined in terms of the index of refraction of the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment having a first point away from the center line, the radius from the waveguide center line to the location of its first refractive index point is the inner radius of that segment. Likewise, the radius from the waveguide center line to the location of the last refractive index point of the segment is the outer radius of that segment.

The segment radii may be conveniently defined in a number of ways. In this application, radii are defined in accord with the figures, described in detail below. The definitions of segment radius and refractive index, used to describe refractive index profile, in no way limit the invention. Definitions are given herein because in carrying out model calculations, the definitions must be used consistently. The model calculations set forth in the tables below are made using the geometrical definitions labeled in the figures and described in the detailed description.

The effective area is generally defined as, $$A_{eff}=2\pi(\int E^2 r\, dr)^2 / (\int E^4 r\, dr),$$

wherein the integration limits are zero to ∞, and E is the electric field associated with the propagated light.

The mode field diameter, $D_{mf}$, is measured using the Peterman II method wherein, $2w = D_{mf}$ and $W^2=(2\int E^2 r\, dr/\int [dE/dr]^2 r\, dr)$, the integral limits being 0 to ∞.

The relative index of a segment, Δ%, as used herein, is defined by the equation, $\Delta\%=100\times(n_i^2-n_c^2)/2n_c^2$, where $n_i$ is the maximum refractive index of the index profile segment denoted as i, and $n_c$, the reference refractive index, is taken to be the minimum index of the clad layer. Every point in the segment has an associated relative index. The maximum relative index is used to conveniently characterize a segment whose general shape is known.

The term refractive index profile or index profile is the relation between Δ% or refractive index and radius over a selected segment of the core.

The term alpha (α) profile refers to a refractive index profile that may be expressed by the equation, $n(r)=n_o(1-\Delta(r/a)^\alpha)$, where r is core radius, Δ is defined above, a is the last point in the profile segment, the value of r at the first point of the α-profile is chosen to accord with the location of the first point of the profile segment, and α is an exponent which defines the profile shape. Other index profiles include a step index, a trapezoidal index and a rounded step index, in which the rounding is usually due to dopant diffusion in regions of rapid refractive index change.

Total dispersion is defined as the algebraic sum of waveguide dispersion and material dispersion. Total dispersion is also referred to as chromatic dispersion in the art. The units of total dispersion are ps/nm-km.

A refractive index profile in general has an associated effective refractive index profile that is different in shape. An effective refractive index profile may be substituted, for its associated refractive index profile without altering the waveguide performance.

The bend resistance of a waveguide fiber is expressed as induced attenuation under prescribed test conditions. The bend test referenced herein is the pin array bend test that is used to compare relative resistance of waveguide fiber to bending. To perform the test, attenuation loss is measured for a waveguide fiber with essentially no induced bending loss. The waveguide fiber is then woven in a serpentine path through the pin array and attenuation again measured. The loss induced by bending is the difference between the two measured attenuation values. The pin array is a set of ten cylindrical pins arranged in a single row and held in a fixed position on a flat surface. The pin spacing is 5 mm, center to center, and the pin diameter is 0.67 mm. During testing, sufficient tension is applied to make the serpentine woven waveguide fiber conform to the portions of the pin surface at which there is contact between the pin and the fiber.

The segmented core optical waveguide described and disclosed herein has a generally segmented core. Each of the segments is described by a refractive index profile, relative refractive index percent, $\Delta_i\%$, and an outside radius, $r_i$. The subscript i on r and Δ refers to a particular segment. The segments are numbered 1 through n beginning with the innermost segment which includes the waveguide long axis centerline. A clad layer having a refractive index of $n_c$ surrounds the core.

The radius, relative refractive index percent, and refractive index profile of each segment of the core are selected to provide: attenuation at 1500 nm no greater than 0.25 dB/km; zero dispersion wavelength in the range of about 1570 nm to about 1600 nm; total dispersion at 1560 nm in the range of about −1.0 ps/nm-km to about −3.0 ps/nm-km; dispersion slope less than 0.1 ps/nm²-km; effective area greater than 60 $\mu m^2$ at 1500 nm; and cut off wavelength of fiber in cabled form is less than about 1500 nm. The novel segmented core design of this application displays the required properties cataloged above.

A general representation of the core refractive index profile is illustrated in FIG. 1, which shows relative refractive index percent chartered versus waveguide radius. Although FIG. 1 shows only four discrete segments, it is understood that the functional requirements may be met by forming a core having more than four segments. However, embodiments having fewer segments are usually easier to manufacture and are therefore preferred.

Index profile structure characteristic of the novel waveguide fiber is shown by core segments 10 and 14, which are non-adjacent segments having positive Δ%, and core segments 12 and 16, which are non-adjacent segments having negative Δ%. The segments having positive and negative Δ% may be separated by more than one segment. The refractive index profile associated with each segment may be adjusted to reach a core design which provides the required waveguide fiber properties.

Figure 2:
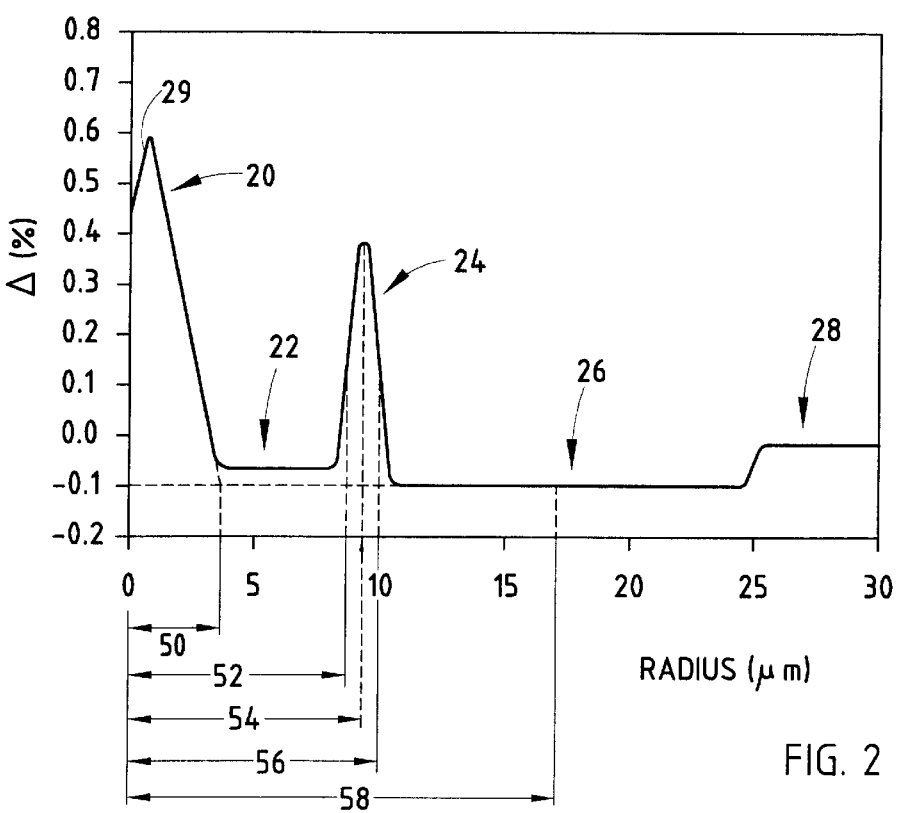
FIG. 2 is a diagram of a waveguide fiber refractive index profile of an optical waveguide having a four segment core and a negative relative index in the first and third annular segments.

FIG. 2 illustrates a variation of the novel waveguide fiber core design. In this design, the segments having positive Δ%, 20 and 24 are still the first and third segments, and the segments having negative Δ%, 22 and 26 are still the second and fourth segments. However, the properties associated with the first and second segments are altered as described below.

Figure 3:
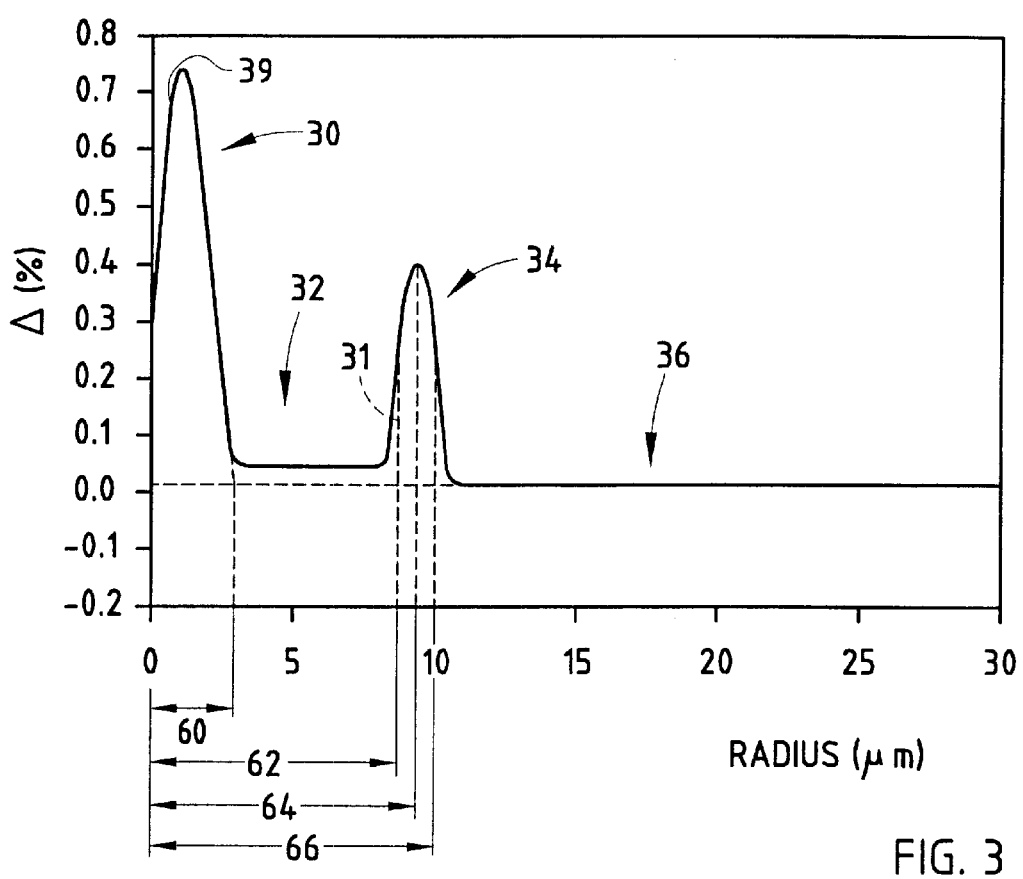
FIG. 3 is a diagram of a waveguide fiber refractive index profile of an optical waveguide having a three segment core and a positive relative index in each and every core segment.

FIG. 3 illustrates yet another variation of the novel waveguide fiber core design. In this case, the core is provided a first, second, and third segment, 30, 32 and 34, respectively. The properties associated with the third embodiment vary from these of the first and second embodiments as discussed in Example 3.

It should be noted that lines 18, 28 and 36, and the respective FIGS. 1, 2 and 3, represent the refractive index of the cladding which is used to calculate the Δ%'s characteristic of the segments.. Further, the rounding of the corners of the step profiles of FIGS. 1, 2 and 3, as well as the center line refractive index depressions 19, 29 and 39 may be due to diffusion of dopant during manufacturing of waveguide fiber. It is possible, but often not necessary to compensate, for example, in the doping step, for such diffusion.

EXAMPLE 1

The diagram of FIG. 1 is an embodiment of the novel waveguide core having four segments 10, 12, 14 and 16, and an inner cladding 18. The central core or first segment 10 has a relative index, $\Delta_i$, of about 0.456%, and an outer radius 40, $r_i$, of about 2.555 $\mu m$. The first surrounding annular segment or second segment 12 has a relative index, $\Delta_2\%$, of about −0.075 percent. The outer radius, $r_i$, of the central segment 10 is also the inner radius of the first annular segment 12. This convention will be used consistently in all of the examples and corresponding figures. The radius $r_i$, therefore, is the intersection of the central segment and the first annular segment. In this case, the intersection point is defined as the intersection of the extrapolated descending portion of the index profile of the central segment 10, represented by line 11, with the horizontal axis 13, defined as the axis through the most negative point or points of the refractive index profile.

The outer radius 42, $r_2$, of the first annular segment 12, is about 8.55 $\mu m$ and is measured from the fiber centerline to the vertical line depending from the half maximum relative index point of the ascending portion of second annular segment 24. The half maximum point is determined using the clad layer, i.e., Δ%=0 as reference. For example, in FIG. 1, second annular segment has a relative index $\Delta_3\%$ of about 0.4%, thus, relative to the Δ%=0 of the clad layer, the magnitude is about 0.4%. Dashed vertical lines 15 depend from the 0.2% points, which are half of the magnitude of $\Delta_3\%$. The center radius 44 of the second annular segment is about 9.2 $\mu m$, while the outer radius, $r_3$, 46 of the second annular segment is about 9.85 $\mu m$. The width of the second annular segment 14 is about 1.3 $\mu m$. The relative index, $\Delta_4\%$, of the fourth segment or third annular segment is about −0.1%.

For profiles having more than one annular segment, the outermost annular segment is characterized by a radius, $r_4$, 48 drawn from the centerline of the optical waveguide fiber to the geometric center of the segment. The geometric center is determined by dividing in half the distance 23 between the vertical lines 15 and 21 drawn from the half magnitude relative index points of the index profiles bounding the outermost annular segment. Magnitude is measured from the horizontal line defined by the most negative Δ%, as described above. The distance 23 is the width of the third annular segment. In example 1, the center radius, $r_4$, 48 of the third annular segment is 17.43 $\mu m$.

The properties of the waveguide fiber of FIG. 1, calculated using a computer model, are given in Table 1.

TABLE 1

| | |
|---|---|
| Zero-dispersion wavelength (nm) | 1581.5 |
| Dispersion slope (ps/nm² · km) | 0.0774 |
| Mode field diameter (μm) | 9.4 |
| Effective area (μm²) | 71 |
| Cable cutoff wavelength (nm) | 1350 |
| Pin array bending loss (dB) | 8.6 |
| Attenuation (dB/km) | 0.208 |

In this example, the effective area is about 71 $\mu m^2$, the pin array bend loss is about 8.6 dB, and the attenuation of the resultant waveguide is about 0.208 dB/km.

EXAMPLE 2

Another embodiment of the novel waveguide having four segments, including a central segment 20, a second segment or first annular segment 22, a third segment or second annular segment 24, and a fourth segment or third annular segment 26, is shown in FIG. 2. In this example, central segment 20 and second annular segment 24 each have a positive relative index, $\Delta_1\%$ and $\Delta_3\%$, of about 0.679% and about 0.4%, respectively. The first annular segment 22 and the third annular segment 26 each have a negative relative index, $\Delta_2\%$ and $\Delta_4\%$, of about −0.075% and about 0.1%, respectively.

The radii for the second embodiment are calculated using the conventions set forth in FIG. 1. The radius 50, $r_1$, of the central segment 20 is about 3.62 $\mu m$. The outer radius 52, $r_2$, of the first annular segment 22 is about 8.85 $\mu m$. The center radius 54 of the second annular segment is about 9.5 $\mu m$, while the outer radius 56, $r_3$, for the second annular segment 24 is about 10.15 $\mu m$. The center radius, $r_4$, 58 of the third annular segment is about 16.63 $\mu m$.

Table 2 sets forth the calculated properties of the FIG. 2 refractive index profile.

TABLE 2

| | |
|---|---|
| Zero-dispersion wavelength (nm) | 1580.9 |
| Dispersion slope (ps/nm$^2$· km) | 0.0774 |
| Mode field diameter (μm) | 9.5 |
| Effective area (μm$^2$) | 70 |
| Cable cutoff wavelength (nm) | 1350 |
| Pin array bending loss (dB) | 8.8 |
| Attenuation (dB/km) | 0.200 |

In this example, the effective area is about 70 μm$^2$, the pin array bending loss is about 8.8 dB, and the attenuation of the resultant waveguide is about 0.200 dB/km.

EXAMPLE 3

Another embodiment of the present invention is a novel waveguide as seen in FIG. 3 and having three segments, including a central core or first segment 30, a first annular or second segment 32, and a second annular or third segment 34. In this example, each and every core segment has a positive relative index. More specifically, central core segment 30 has a positive relative index, $\Delta_1\%$, of about 0.88%, first annular segment 32 has a positive relative index of about 0.025%, and second annular segment 34 has a positive relative index of about 0.4%.

The radii for the core segments of the third embodiment are calculated in accordance with the conventions discussed above. Central core 30 has an outer radius, $r_1$, 60 of about 3.00 μm. First annular segment 32 has an outer radius, $r_2$, 62 of about 7.7 μm. Second annular segment 34 has a central radius 64 of about 8.2 μm and an outer radius, $r_2$, 66 of about 8.7 μm.

Table 3 sets forth the calculated properties of the FIG. 3 refractive index profile.

TABLE 3

| | |
|---|---|
| Zero-dispersion wavelength (nm) | 1576.7 |
| Dispersion slope (ps/nm$^2$ · km) | 0.0993 |
| Mode field diameter (μm) | 9.5 |
| Effective area (μm$^2$) | 70 |
| Cable cutoff wavelength (nm) | 1400 |
| Pin array bending loss (dB) | 27 |
| Attenuation (dB/km) | 0.202 |

In example 3, the effective area is about 71 μm$^2$, the pin array bending loss is about 27 dB, and the attenuation of the resultant waveguide is about 0.202 dB/km.

The profiles of FIGS. 1, 2 and 3 are members of a group of profiles that exhibit similar performance to that set forth in Tables 1, 2 and 3. The group of refractive index profiles in accord with FIGS. 1, 2 and 3 and that have substantially similar functional parameters have relative indexes in the respective ranges of about 0.4% to about 0.9% for the central segment, $\Delta_1\%$, of about −0.2% to about 0.1% for the first annular segment, 2%, of about 0.2% to about 0.5% for the second annular segment, $\Delta_3\%$, and about −0.2% to about 0% for the third annular segment, $\Delta_4\%$. The corresponding radii of the group are in the respective ranges of about 2.3 μm to about 4 μm for $r_1$, and about 7.8 μm to about 10 μm for the center radius of the second annular segment. The width of the second annular segment is within the range of about 0.5 μm to about 3.5 μm. These radii further correspond to an inner cladding radius within the range of about 22 μm to about 35 μm.

The refractive indices and the cross sectional profile of the fibers made according to the present invention can be accomplished using manufacturing techniques known to those skilled in the art.

It will become apparent to those skilled in the art that various modifications to the preferred embodiment of the invention as described herein can be made without departing from the spirit or scope of the invention as defined by the appended claims.

The invention claimed is:

1. A single mode optical waveguide fiber, comprising:

a core region having a central segment, a first annular segment, a second annular segment, and a third annular segment, each said segment having a relative refractive index percent, and an inner and outer radius; and a clad layer surrounding and in contact with the core, the clad layer having a relative refractive index percent;

wherein, the radius and relative refractive index percent and the radii of each segment are chosen from the following ranges:

the relative refractive index percent of the central segment within the range of from about 0.4% to about 0.9%;

the relative refractive index percent of the first annular segment within the range of from about −0.2% to about 0.1%;

the relative refractive index percent of the second annular segment within the range of from about 0.2% to about 0.5%;

the relative refractive index percent of the third annular segment within the range of from about −0.2% to about 0%;

the outer radius of the central segment within the range of from about 2.3 μm to about 4 μm;

the center radius of the second annular segment within the range of from about 7.8 μm to about 10 μm;

the width of the second annular segment within the range of from about 0.5 μm to about 3.5 μm; and, the outer radius of the third annular segment within the range of from about 22 μm to 35 μm; and wherein the relative refractive index percents and radii are further selected to provide a dispersion slope within the optical waveguide fiber of less than about 0.1 ps/nm$^2$-kM.

2. The single mode optical waveguide fiber of claim 1, wherein the dispersion slope is less than 0.08 ps/nm$^2$-km.

3. The single mode optical waveguide fiber of claim 1, wherein at least two non-adjacent core segments have a relative refractive index percent that is positive, and at least two non-adjacent core segments have a relative refractive index percent that is negative.

4. The single mode optical waveguide fiber of claim 3, wherein the pin array bend loss of the fiber is less than about 20 dB.

5. The single mode optical waveguide fiber of claim 3 wherein the pin array bend loss of the fiber is less than about 8.6 dB.

6. The single mode optical waveguide fiber of claim 4, wherein the attenuation in the optical waveguide fiber is less than about 0.25 dB.

7. The single mode optical waveguide fiber of claim 4 wherein the attenuation in the optical waveguide fiber is about 0.200 db.

8. The single mode optical waveguide fiber of claim 6, wherein the attenuation in the optical waveguide fiber is less than 0.202 dB/km.

9. The single mode optical waveguide fiber of claim 1, wherein each core segment has a positive relative refractive index percent.

10. The single mode optical waveguide fiber of claim 1, wherein at least one of the segments has a negative relative refractive index percent.

11. A single mode optical waveguide fiber, comprising:

a core region having segments, the respective segments having positive relative refractive index percent, said core region including a central segment, a first annular segment, and a second annular segment, each said segment having a positive relative refractive index percent, and an inner and outer radius; and a clad layer surrounding and in contact with the core, the clad layer having a relative refractive index percent;

wherein, the radius and relative refractive index percent of each segment are chosen from the following ranges:

the relative refractive index percent of the central segment within the range of about 0.4% to about 0.9%;

the relative refractive index percent of the first annular segment within the range of about 0 to about 0.1%;

the relative refractive index percent of the second annular segment within the range of about 0.2% to about 0.5%;

the outer radius of the central segment within the range of about 2.3 μm and about 4 μm; and the center radius of the second annular segment within the range of about 7.8 μm and about 10 μm; wherein, the relative refractive index percents and radii are selected to provide an effective area greater than or equal to 60 μm2 and a dispersion slope within the fiber of less than about 0.1 ps/nm$^2$-km.

12. The single mode optical waveguide fiber of claim 11, wherein the dispersion slope is less than 0.08 ps/nm$^2$-km.

13. The single mode optical waveguide fiber of claim 12, wherein the pin array bending loss is less than about 27 db.

14. The single mode optical waveguide fiber of claim 13, wherein the attenuation in the optical waveguide fiber is less than 0.25 dB/km.

15. The single mode optical waveguide fiber of claim 13 wherein the attenuation in the optical waveguide fiber is less than 0.202 dB.

16. The single mode optical waveguide fiber of claim 11, wherein the attenuation in the optical waveguide fiber is less than 0.25 dB/km.

17. A single mode optical waveguide fiber, comprising:

a core region having a central segment, a first annular segment, a second annular segment, and a third annular segment, each said segment having a relative refractive index percent, and an inner and outer radius; and a clad layer surrounding and in contact with the core, the clad layer having a relative refractive index percent;

wherein, the radius and relative refractive index percent and the radii of each segment are chosen from the following ranges:

the relative refractive index percent of the central segment within the range of from about 0.4% to about 0.9%;

the relative refractive index percent of the first annular segment within the range of from about 0% to about 0.1%;

the relative refractive index percent of the second annular segment within the range of from about 0.2% to about 0.5%;

the relative refractive index percent of the third annular segment is positive and about 0%;

the outer radius of the central segment within the range of from about 2.3 μm to about 4 μm;

the center radius of the second annular segment within the range of from about 7.8 μm to about 10 μm;

the width of the second annular segment within the range of from about 0.5 μm to about 3.5 μm; and, the outer radius of the third annular segment within the range of from about 22 μm to 35 μm; and wherein, the dispersion slope within the optical waveguide fiber is less than about 9.1 ps/nm$^2$-km.

* * * * *

UNITED STATES PATENT AND TRADEMARK OFFICE
CERTIFICATE OF CORRECTION

PATENT NO. : 6,424,778 B1
DATED : July 23, 2002
INVENTOR(S) : Ming-Jun Li

It is certified that error appears in the above-identified patent and that said Letters Patent is hereby corrected as shown below:

<u>Column 8,</u>
Line 40, "of less than about 0.1 ps/nm$^2$-kM." should be -- of less than about 0.1 ps/nm$^2$-km. --

<u>Column 9,</u>
Line 32, "wherein the pin array bending loss is less than about 27 db." should be -- wherein the pin array bending loss is less than about 27 dB. --

<u>Column 10,</u>
Line 33, "less than about 9.1 ps/nm$^2$-km." should be -- less than about 0.1 ps/nm$^2$-km. --

Signed and Sealed this

Twenty-second Day of July, 2003

JAMES E. ROGAN
*Director of the United States Patent and Trademark Office*